(12) United States Patent
Mohamed et al.

(10) Patent No.: US 12,026,185 B2
(45) Date of Patent: Jul. 2, 2024

(54) DOCUMENT SEARCH AND ANALYSIS TOOL

(71) Applicant: Chevron U.S.A. Inc., San Ramon, CA (US)

(72) Inventors: Mohamed Ibrahim Mohamed, Houston, TX (US); Larry A. Bowden, Jr., Houston, TX (US); Xin Feng, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 184 days.

(21) Appl. No.: 17/188,774

(22) Filed: Mar. 1, 2021

(65) Prior Publication Data
US 2022/0277032 A1 Sep. 1, 2022

(51) Int. Cl.
*G06F 16/332* (2019.01)
*G06N 5/02* (2023.01)
*G06N 20/00* (2019.01)

(52) U.S. Cl.
CPC .......... *G06F 16/3326* (2019.01); *G06N 5/02* (2013.01); *G06N 20/00* (2019.01)

(58) Field of Classification Search
CPC ....... G06F 16/3326; G06N 20/00; G06N 5/02
USPC ........................................................ 707/759
See application file for complete search history.

(56) References Cited

U.S. PATENT DOCUMENTS

| | | | |
|---|---|---|---|
| 8,819,451 B2 | 8/2014 | Lokam | |
| 8,843,821 B2 | 9/2014 | Tran | |
| 10,248,718 B2 | 4/2019 | Podder | |
| 10,497,366 B2 | 12/2019 | Sapugay | |
| 2007/0003166 A1* | 1/2007 | Berkner | G06V 30/166 382/175 |
| 2008/0033741 A1* | 2/2008 | Van Luchene | G06Q 10/00 705/310 |
| 2010/0125566 A1* | 5/2010 | Gibbs | G06F 16/33 707/E17.014 |
| 2011/0302172 A1* | 12/2011 | Chandrasekar | G06F 16/3322 707/E17.084 |
| 2011/0320186 A1 | 12/2011 | Butters | |
| 2013/0013603 A1 | 1/2013 | Parker | |

(Continued)

FOREIGN PATENT DOCUMENTS

WO    2016036760    3/2016

OTHER PUBLICATIONS

AU Examination Report from AU Application No. 2022228414, mailed Oct. 23, 2023 (3 pages).

(Continued)

*Primary Examiner* — Hosain T Alam
*Assistant Examiner* — Saba Ahmed
(74) *Attorney, Agent, or Firm* — Esplin & Associates, PC

(57) ABSTRACT

Keywords obtained from a user and/or extracted from uploaded document(s) may be used to generate potential keywords. Documents may be identified based on the keywords and the potential keywords accepted by the user. A knowledge graph model representing the identified documents may be generated. The knowledge graph model may include document nodes representing the identified document and a search node representing the keywords. The relative position of the document nodes with respect to the search node may represent similarity between the corresponding documents and the keywords.

20 Claims, 5 Drawing Sheets

(56) References Cited

U.S. PATENT DOCUMENTS

| | | |
|---|---|---|
| 2015/0169582 A1 | 6/2015 | Jain |
| 2016/0378805 A1* | 12/2016 | Hopcroft |
| 2018/0039696 A1* | 2/2018 | Zhai ................. G06F 16/35 |
| 2018/0060733 A1* | 3/2018 | Beller ............... G06F 16/24578 |
| 2019/0114304 A1* | 4/2019 | Oliveira ............. G06F 16/285 |
| 2019/0354636 A1 | 11/2019 | Hershowitz |
| 2019/0370397 A1* | 12/2019 | Kummamuru ........ G06F 40/295 |
| 2021/0012103 A1 | 1/2021 | Bassu |
| 2021/0013103 A1* | 1/2021 | Chang ............... H01L 21/02263 |
| 2021/0056261 A1* | 2/2021 | Sullivan ............ G06F 40/20 |
| 2021/0133390 A1* | 5/2021 | Tagawa .............. G06T 11/206 |
| 2022/0253477 A1* | 8/2022 | Lipka ............... G06N 20/00 |
| 2022/0277220 A1 | 9/2022 | Mohamed |

OTHER PUBLICATIONS

AU Examination Report from AU Application No. 2022228415, mailed Oct. 18, 2023 (3 pages).

Bi et al., PALM: Pre-training an Autoencoding&Autoregressive Language Model for Context-conditioned Generation•, Sep. 20, 2020 (Sep. 20, 2020) [online], [retrieved May 8, 2022]. Retrieved from the Internet <URL: https:/larxiv.org/pdf/2004.07159.pdf?fbclid= IwAR0BNI1lzR5bhcuEbyfNw2UN7MApHFoFP3BN4OFKkW8x3bqolK_HilU293>, entire document, especially4, col. 2, para 3, p. 6, col. 2, para 2, p. 7 col. 1, para 1, and p. 8, col. 2, para 3.

International Search Report and Written Opinion for PCT Application No. PCT/US2022/018082, mailed Jun. 9, 2022 (8 pages).

\* cited by examiner

DOCUMENT SEARCH AND ANALYSIS TOOL

The present disclosure relates generally to the field of document searching and analysis using a knowledge graph model.

BACKGROUND

Identifying and analyzing documents related to a subject matter may be difficult and time consuming. Document identification may be poorly performed due to lack of proper search terms, and sorting through the identified documents may require too much time and/or may be cost-prohibitive.

SUMMARY

This disclosure relates to document searching and analysis. A set of keywords may be obtained for use in searching for documents. A set of potential keywords may be generated based on the set of keywords and/or other information. One or more potential keywords may be selected from the set of potential keywords for use in searching for the documents. The set of keywords and the potential keyword(s) selected from the set of potential keywords may form a set of selected keywords. The documents may be identified based on the set of selected keywords and/or other information. A knowledge graph model that represents the identified documents may be generated. The knowledge graph model may include document nodes representing the identified documents and a first search node representing the set of selected keywords. Relative position of the individual document nodes with respect to the first search node may represent similarity between corresponding identified documents and the set of selected keywords.

A system for document searching and analysis may include one or more electronic storage, one or more processors and/or other components. The electronic storage may store information relating to documents, information relating to keywords, information relating to potential keywords, information relating to selected keywords, information relating to knowledge graph models, and/or other information.

The processor(s) may be configured by machine-readable instructions. Executing the machine-readable instructions may cause the processor(s) to facilitate document searching and analysis. The machine-readable instructions may include one or more computer program components. The computer program components may include one or more of a keyword component, a potential keyword component, a keyword selection component, a document component, a model component, and/or other computer program components.

The keyword component may be configured to obtain one or more sets of keywords. The set(s) of keywords may be obtained for use in searching for documents. In some implementations, a set of keywords may include one or more keywords inputted by a user. In some implementations, a set of keywords may include one or more keywords extracted from a source document.

The potential keyword component may be configured to generate one or more sets of potential keywords. The set(s) of potential keywords may be generated based on the set(s) of keywords and/or other information. In some implementations, the set(s) of potential keywords may be generated further based on a word-to-vector model and/or a sentence-to-vector model. In some implementations, the set(s) of potential keywords may be generated further based on domain-specific models. Individual domain specific model may include an unsupervised vector model trained based on words corresponding to a specific domain.

The keyword selection component may be configured to select one or more potential keywords from the set(s) of potential keywords. The potential keyword(s) may be selected for use in searching for the documents. The set(s) of keywords and the potential keyword(s) selected from the set(s) of potential keywords may form a set of selected keywords. In some implementations, the potential keyword(s) may be selected from the set(s) of potential keywords for use in searching for the documents based on user acceptance of the potential keyword(s).

The document component may be configured to identify the documents. The documents may be identified based on the set of selected keywords and/or other information. In some implementations, the documents may be identified based on searching within one or more databases.

The model component may be configured to generate a knowledge graph model that represents the identified documents. The knowledge graph model may include document nodes representing the identified documents and a first search node representing the set of selected keywords. Relative position of the individual document nodes with respect to the first search node may represent similarity between corresponding identified documents and the set of selected keywords.

In some implementations, edges may exist between the document nodes and the first search node. Individual edges may be labeled with a similarity score reflecting the similarity between the corresponding identified documents and the set of selected keywords.

In some implementations, the knowledge graph model may further include a second search node representing a subset of the set of selected keywords. Relative position of the individual document nodes with respect to the second search node may represent similarity between the corresponding identified documents and the subset of the set of selected keywords.

In some implementations, one or more analytics may be performed on the identified documents to generate one or more categorical reports for the identified documents. The categorical report(s) may include division of the identified documents into multiple categories.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to document searching and analysis. Keywords obtained from a user and/or extracted from uploaded document(s) may be used to generate potential keywords. Documents may be identified based on the keywords and the potential keywords accepted by the user. A knowledge graph model representing the identified documents may be generated. The knowledge graph model may include document nodes representing the identified document and a search node representing the keywords. The relative position of the document nodes with respect to the search node may represent similarity between the corresponding documents and the keywords.

Figure 1:
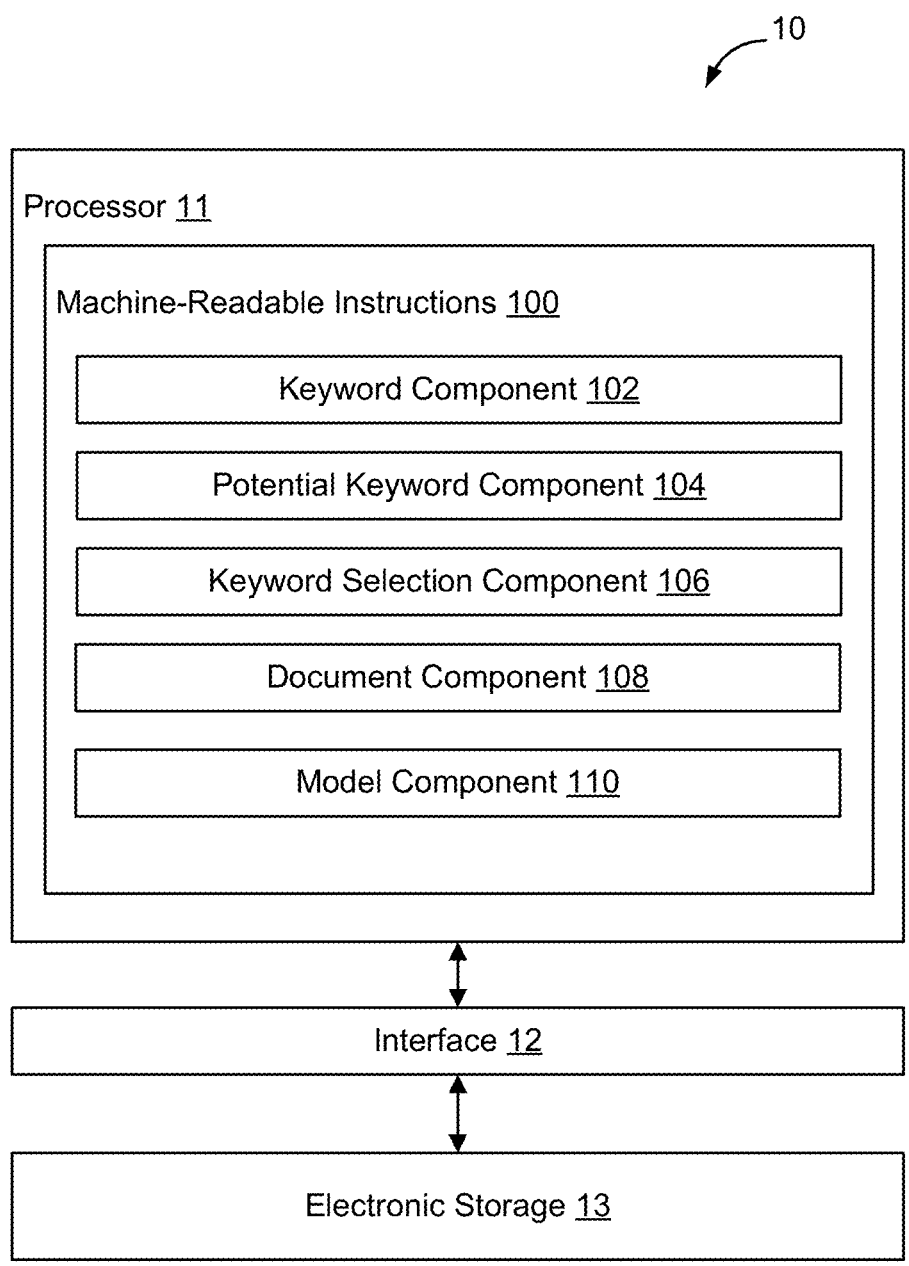
FIG. 1 illustrates an example system for document searching and analysis.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, and/or other components. A set of keywords may be obtained by the processor 11 for use in searching for documents. A set of potential keywords may be generated by the processor 11 based on the set of keywords and/or other information. One or more potential keywords may be selected from the set of potential keywords for use in searching for the documents. The set of keywords and the potential keyword(s) selected from the set of potential keywords may form a set of selected keywords. The documents may be identified by the processor 11 based on the set of selected keywords and/or other information. A knowledge graph model that represents the identified documents may be generated by the processor 11. The knowledge graph model may include document nodes representing the identified documents and a search node representing the set of selected keywords. Relative position of the individual document nodes with respect to the search node may represent similarity between corresponding identified documents and the set of selected keywords.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to documents, information relating to keywords, information relating to potential keywords, information relating to selected keywords, information relating to knowledge graph models, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate document searching and analysis. The machine-readable instructions 100 may include one or more computer program components. The machine-readable instructions 100 may include a keyword component 102, a potential keyword component 104, a keyword selection component 106, a document component 108, a model component 110, and/or other computer program components.

The keyword component 102 may be configured to obtain one or more sets of keywords. Obtaining a set of keywords may include one or more of accessing, acquiring, analyzing, determining, examining, identifying, loading, locating, opening, receiving, retrieving, reviewing, selecting, storing, and/or otherwise obtaining the set of keywords. A set of keywords may include one or more keywords. A keyword may include a single word, multiple words, a single phrase, or multiple phrases. A keyword may refer to word(s)/phrase(s) to be used in a search for documents. The keyword component 102 may obtain the set(s) of keywords for use in searching for documents.

In some implementations, a set of keywords may include one or more keywords inputted by a user. For example, the user may interact with the system 10 through one or more software (e.g., web-based software) that enables the user to provide/enter keyword(s) to be used in searching for documents. In some implementations, a set of keywords may include one or more keywords extracted from one or more source documents. A source document may refer to a document that provides one or more keywords to use in searching for documents. A source document may be provided by a user. The keyword component 102 may analyze the words contained in a source document to identify keywords from the source document. In some implementations, the keywords may be extracted from a source document using natural language processing. For instance, the keywords may be extracted from a source document based on n-gram, based on a specific number of words that may be combined (e.g., 2, 3, 4, or 5-word combinations) for uniqueness, and/or based on how often words are repeated within the source document. For example, check may be performed on whether addition of a word makes a phrase more or less unique, and unique phrases may be extracted as keywords.

The potential keyword component 104 may be configured to generate one or more sets of potential keywords. A set of potential keywords may include one or more potential keywords. A potential keyword may refer to a single word, multiple words, a single phrase, or multiple phrases that may be selected for use in a search for documents. The set(s) of potential keywords may be generated based on the set(s) of keywords and/or other information. The potential keyword component 104 may use the keyword(s) obtained by the keyword component 102 to generate word(s)/phrase(s) that may be used as additional keyword(s) in a search for document. A potential keyword may be similar to and/or related to one or more keywords.

In some implementations, the set(s) of potential keywords may be generated using natural language processing. That is, the keyword(s) obtained by the keyword component 102 may be analyzed using natural language processing to generate potential keywords. In some implementations, natural language processing may include a word-to-vector model, a sentence-to-vector model, a graphical model, and/or other models. The set(s) of potential keywords may be generated based on the word-to-vector model, the sentence-to-vector model, the graphical model, and/or other models. The set(s) of potential keywords may include single words, multiple words, single phrases, and/or multiple phrases having similar vectors as the keywords. The set(s) of potential keywords may include single words, multiple words, single phrases, and/or multiple phrases having similar vector relationships (e.g., similar vector distances) as the keywords. In some implementations, the set(s) of potential keywords may include single words, multiple words, single phrases, and/or multiple phrases that are unique in a distribution of words/phrases (e.g., distribution of distances between words/phrases).

In some implementations, the set(s) of potential keywords may be generated further based on multiple domain-specific models. A domain-specific model may refer to a model that is trained for a specific area of knowledge/information. Individual domain-specific model may include an unsupervised vector model trained based on words corresponding to a specific domain. Individual domain-specific model may represent the vocabulary of the specific domain. Individual domain-specific model may represent the concepts of the specific domain. Individual domain-specific model may provide domain-specific word/sentence representation and/or classification. For example, separate domain-specific models may be trained for geoscience domain, computer science domain, and legal domain, with the geoscience-specific model including an unsupervised vector model trained based on words corresponding to the geoscience domain, the computer science-specific model including an unsupervised vector model trained based on words corresponding to the computer science domain, and the legal-specific model including an unsupervised vector model trained based on words corresponding to the legal domain. Use of other domains-specific model is contemplated.

Use of multiple domain-specific models may enable generation of the set(s) of potential keywords based on graph relationships. For example, separate domain-specific models may be combined within a graph model, and the set(s) of potential keywords may be generated based on relationships within the graph model. The graph model may be used to determine differences in meaning of words within different domains. For example, the graph model may be used to identify ambiguous words that have a particular meaning within one domain but a different meaning within another domain.

In some implementations, the set(s) of potential keywords may be generated based on identification of related/similar documents. For example, the potential keyword component 104 may identify documents containing the keyword(s) and/or documents similar to the source document(s), and the set(s) of potential keywords may be extracted from the identified documents.

The keyword selection component 106 may be configured to select one or more potential keywords from the set(s) of potential keywords. Selecting a potential keyword from a set of potential keywords may include ascertaining, choosing, determining, establishing, finding, identifying, obtaining, and/or otherwise selecting the potential keyword from the set of potential keywords. The potential keyword(s) may be selected for use in searching for documents. That is, the keyword selection component 106 may selected, from the set(s) of potential keywords, the potential keyword(s) that will be used to search for documents. The set(s) of keywords obtained by the keyword component 102 and the potential keyword(s) selected from the set(s) of potential keywords by the keyword selection component 106 may form a set of selected keywords. That is, the original keywords and the selected potential keywords may form the whole set of search keywords. Thus, the potential keyword(s) selected by the keyword selection component 106 may be added to the keywords to be used in searching for documents.

In some implementations, the potential keyword(s) may be selected from the set(s) of potential keywords for use in searching for the documents based on user acceptance of the potential keyword(s). User acceptance of potential keyword (s) may be received through one or more software (e.g., web-based software). For instance, a web-based software may display the potential keywords within a graphical user interface. The user may interact with the graphical user interface to accept one or more potential keywords for use in searching for document. The user may interact with the graphical user interface to reject one or more potential keywords and exclude them from use in searching for documents. In some implementation, the graphical user interface may enable a user to remove one or more original keywords and exclude them from use in searching for documents. For instance, the graphical user interface may display original keywords and potential keywords generated from the original keywords. The graphical user interface may enable a user to determine which ones of the original keywords and potential keywords will be used in searching for documents. The graphical user interface may enable a user to determine which ones of the original keywords and potential keywords will be removed and excluded from use in searching for documents.

Figure 3:
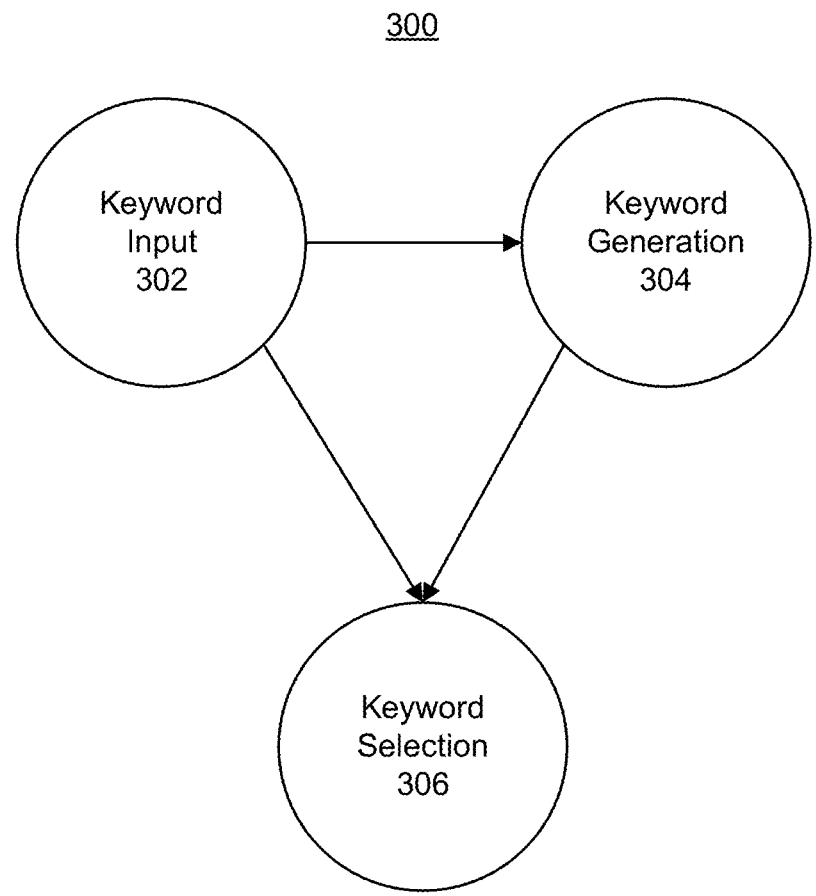
FIG. 3 illustrates an example process for selecting keywords.

FIG. 3 illustrates an example process 300 for selecting keywords. The process 300 may begin with keyword input 302, such as receiving direct input of keywords from a user and/or extracting keywords from one or more source documents provided by the user. The process 300 may continue with keyword generation 304, where the keywords obtained from the keyword input 302 are used to generate potential keywords. Then keyword selection 306 may be performed to combine as the whole set of search keywords: (1) the keywords obtained from the keyword input 302, and (2) one or more potential keywords selected by the user.

The document component 108 may be configured to identify documents. Identifying documents may include discovering, finding, pinpointing, selecting, and/or otherwise identifying documents. A document may refer to one or more collections of information. Information may be included in a document as one or more words (text). A document may include an electronic document. A document may be stored within one or more files. Information within a document may be stored in one or more formats and/or containers. A format may refer to one or more ways in which the information within a document is arranged/laid out (e.g., file format). A container may refer to one or more ways in which information within a document is arranged/laid out in association with other information (e.g., zip format). For example, information within a document may be stored in one or more of a text file (e.g., TXT file, DOC file, PDF file), a communication file (e.g., email file, text message file), a spreadsheet file (e.g., XLS file), a presentation file (e.g., PPT file), a visual file (e.g., image file, video file) and/or other files.

The documents may be identified based on the set of selected keywords and/or other information. The documents may be identified based on the set(s) of keywords obtained by the keyword component 102 and the potential keyword(s) selected from the set(s) of potential keywords by the keyword selection component 10. A document may be identified by the document component 108 based on the document including some or all of the selected keywords. The document component 108 may identify documents that include content that matches some or all of the selected keywords.

In some implementations, search parameters used by the document component 108 may specify how many and/or which of the selected keywords must appear within a document for the document to be identified by the document component 108. In some implementations, the search parameters used by the document component 108 may use different weights for different ones of the selected keywords. In some implementations, the search parameters used by the document component 108 may include use of filters and/or weights for different types of documents. In some implementations, the search parameters used by the document component 108 may include use of filters and/or weights for documents in different domains/fields. In some implementations, the search parameters used by the document component 108 may include use of filters and/or weights for different document contributors (e.g., authors, organizations). In some implementations, the search parameters used by the document component 108 may use relationships between two or more of the selected keywords. For instance, the search parameters may require a document to include a particular keyword within a certain number of words/sentences/paragraphs of another keyword to be identified as a matching document. Use of other criteria within the search parameters is contemplated.

In some implementations, the documents may be identified based on searching within one or more databases. Individual databases may include different types of documents. Individual databases may include different collections of documents. In some implementations, information with the documents may be converted from non-textual form to textual form to allow for searching. For instance, images and/or other unsearchable documents may be processed to extract text contained within the documents. The extracted text may be used to search through the document for the selected keywords.

The model component 110 may be configured to generate a knowledge graph model that represents the identified documents. The knowledge graph model may refer to a model that represents the identified documents and information relating to the identified documents using one or more graphs. The knowledge graph model may represent the identified documents and information relating to the identified documents using nodes. The knowledge graph model may include document nodes representing the identified documents. The knowledge graph model may include one or more search nodes representing the selected keywords. For example, the knowledge graph model may include a general search node representing the set of selected keywords (all of the search query used to find the documents). The knowledge graph model may include one or more subset search nodes representing subset(s) of the set of selected keywords (portion(s) of the search query used to find the documents).

The relative position of individual documents nodes with respect to the search nodes may represent similarity between corresponding identified documents and the selected keywords represented by the search nodes. The relative position of a document node with respect to a search node may include the distance between the document node and the search and/or the direction from the search node to the document node (or vice versa). For example, the relative position of the individual document nodes with respect to the general search node may represent similarity between corresponding identified documents and the set of selected keywords. The relative position of the individual document nodes with respect to a subset search node may represent similarity between the corresponding identified documents and a subset of the set of selected keywords.

Edges may exist between the document nodes and the search node(s). In some implementations, individual edges may be labeled with a similarity score reflecting the similarity between the corresponding identified documents and the search query represented by a search node (entirety or portion of the search query). In some implementations, other information relating to the documents may be displayed within the knowledge graph model. For example, the knowledge graph model may display information relating to dates of the documents, sizes of the documents, authors of the documents, owners of the documents, publications of the documents, and/or other information relating to the documents. In some implementations, the knowledge graph model may display Eigenvalue calculation from a graph of document word vectors.

In some implementations, the knowledge graph model may be an interactive model. A user may interact with the knowledge graph model to obtain one or more of the identified documents. For example, individual document nodes may operate as a shortcut to the corresponding document. A user may prompt retrieval of (e.g., open, download) a document by clicking the corresponding document node.

Figure 4A:
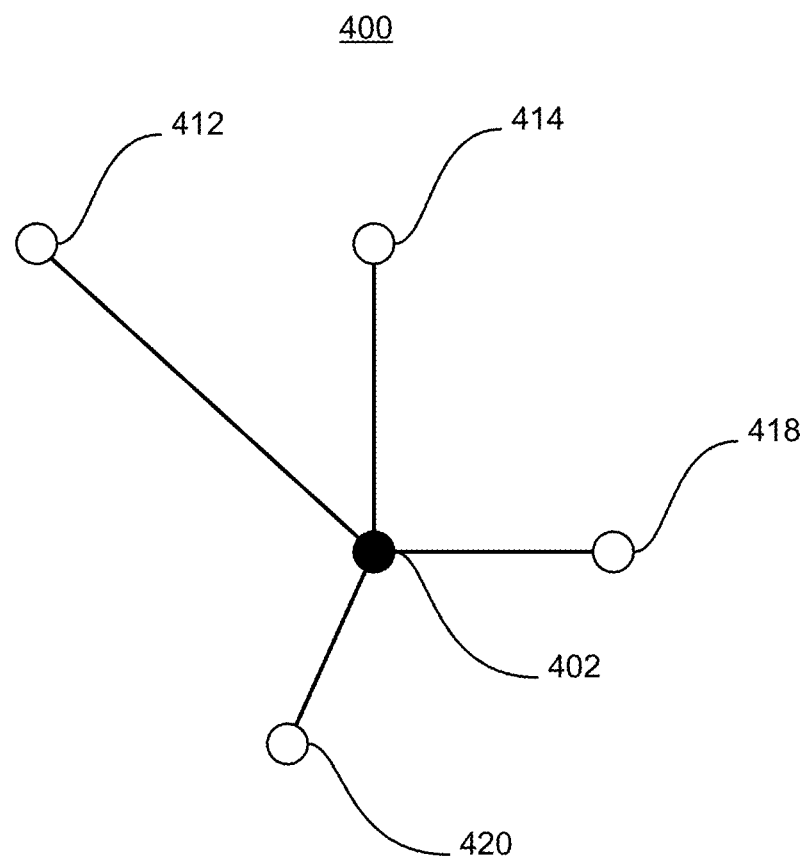
FIG. 4A illustrates an example knowledge graph model.
Figure 4B:
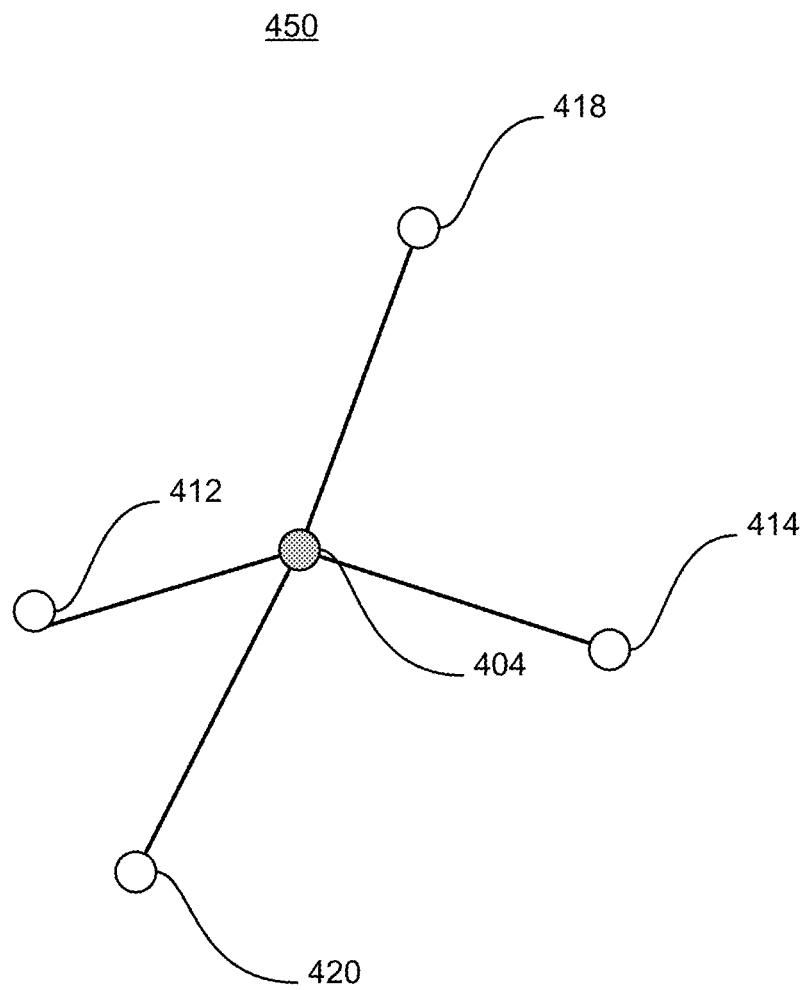
FIG. 4B illustrates an example knowledge graph model.

FIGS. 4A and 4B illustrate example knowledge graph models 400, 450. In FIG. 4A, the graph model 400 may include document nodes 412, 414, 418, 420 and a search node 402. The document nodes 412, 414, 418, 420 may represent different documents identified based on a set of selected keywords. The search node 402 may represent the entirety of selected keywords (whole search query). The relative position of the document nodes 412, 414, 418, 420 with respect of the search node 402 may represent similarity between the corresponding identified documents and the entirety of the selected keywords. Shorter distances between the document nodes 412, 414, 418, 420 and the search node 402 may indicate greater similarity between the corresponding identified documents and the entirety of the selected keywords. Longer distances between the document nodes 412, 414, 418, 420 and the search node 402 may indicate less similarity between the corresponding identified documents and the entirety of the selected keywords. The knowledge graph model 400 may normalize the distances between the document nodes 412, 414, 418, 420 and the search node 402 so that the entire knowledge graph model 400 fits within a given area (e.g., fits on a screen).

In FIG. 4B, the graph model 450 may include the document nodes 412, 414, 418, 420 and a search node 404. The search node 404 may represent a subset of the selected keywords (a portion of the search query). The relative position of the document nodes 412, 414, 418, 420 with respect of the search node 404 may represent similarity between the corresponding identified documents and the subset of the selected keywords.

The relative position of the document nodes 412, 414, 418, 420 with respect to the search node 402 shown in FIG. 4A may be different from the relative position of the document nodes 412, 414, 418, 420 with respect to the search node 404 shown in FIG. 4B. The difference in placement of the document nodes 412, 414, 418, 420 between the knowledge graph models 400, 450 may show different similarities of the documents between the entirety of the selected keywords and the subset of the selected keywords. For instance, as shown in FIG. 4A, the document that most closely matches the entire selected keywords may be the document represented by the document node 420. As shown in FIG. 4B, the document that most closely matches the subset of selected keywords may be the document represented by the document node 412. While the knowledge graph models 400, 450 are shown with one search node each, this is merely as an example and is not meant to be limiting. In some implementations, a knowledge graph model may include multiple search nodes representing different sets of selected keywords.

The knowledge graph model may assist users in determining which identified documents are most relevant to the search query. The knowledge graph model may allow the users to determine which of the documents will be reviewed and/or the order in which the documents will be reviewed based on their proximity of the corresponding document nodes to the search node(s). For instance, a user may start by reviewing documents with document nodes closest to the search node(s). A user may target documents with document nodes near a particular search node to target documents that meet a particular portion of the search query. The knowledge graph model may provide visualization of similarity among the identified documents through clustering. Documents that are similar to each other may be placed near each other within the knowledge graph model. Different clusters of documents nodes may indicate different clusters of similar documents. The density of document nodes within the knowledge graph model may indicate how unique/similar the identified documents are to each other.

In some implementations, one or more analytics may be performed on the identified documents to generate one or more categorical reports for the identified documents. A categorical report may include division of the identified documents into multiple categories. In some implementations, a categorical report may include division of the identified documents into different categories, and one or more subdivision of documents in different categories into multiple subcategories. For example, the documents may be divided base on dates of the documents, sizes of the documents, authors of the documents, owners of the documents, publications of the documents, and/or other information relating to the documents. The division of the identified documents into categories may be presented in one or more visual forms, such as in charts, graphs, maps, and/or other visual forms. Other analytics and/or analysis of the documents is contemplated.

In some implementations, the current disclosure may be utilized to facilitate technology search, technology landscape review, and/or other analysis of technology. For example, the current disclosure may be utilized to facilitate searching of information (e.g., prior art, publication) relating to particular technology (e.g., invention, research area). Such information may be used to assess novelty of technology.

In some implementations, the current disclosure may be utilized to facilitate prior art searching for particular invention and/or to structure disclosure of the invention. The current disclosure may be utilized to provide guidance on filing protection for the invention (e.g., patent application filing). Additionally, high risk portions of the disclosure (e.g., high risk claims) may be identified and resolutions to such may be provided.

For example, the current disclosure may be utilized to identify prior art relating to an invention and assess novelty of the invention. A user may provide keywords to be used in searching for prior art. The keywords provided by the user may be utilized to generate other words that may be used in searching for prior art. A user may select keywords that will be used in the search. The prior art found in the search may be presented using a knowledge graph model. The knowledge graph model may enable the user to determine similarity of the prior art to the search query and to review the prior art. Other analysis may be performed to assist the user in determining whether to proceed with filing protection for the invention (e.g., patent application filing).

For instance, a user may provide (e.g., upload) information about an invention (e.g., invention disclosure, patent claims) and analysis may be performed to identify and classify high risk portions. High risk portion may refer to a portion of the invention information that may be duplicative of prior art and/or may have a high probability (e.g., greater than a certain percentage, such as greater than 50%) of being rejected as being disclosed/suggested by the prior art. Information relating to obtaining protection for the invention may be generated and provided to the user. For example, the user may be provided with information on likelihood of acceptance of the patent claims for the invention, examiner information, industry categorization, and/or other information that may assist the user in making decision on whether to attempt to protect the invention.

For instance, a user may upload a document containing patent claims for the invention. The language of the claims may be analyzed to determine whether the same or similar claim language has been addressed or rejected at one or more patent offices. The probability of the claims being accepted or rejected at patent office(s) may be determined based on similarity of the current claims to claims previously addressed/rejected at the patent office(s) (e.g., based on history of rejection of similar/same claim language at the patent office(s)). In some implementations, analysis of the claim language may be performed using one or more text classification models. The text classification models may be trained using claims that have been challenged/rejected at patent office(s) and/or claims that have been unchallenged/accepted at patent office(s). In some implementations, the accuracy of the classification by the text classification models may be increased by training the text classification models with art unit information, examiner information, and/or other information relating to the claims/patent office(s). For instance, the text classification models may take into account not just whether particular claim language has been previously rejected/accepted, but also on the art unit in which the claims were processed and/or the examiner that reviewed the claims. In some implementations, the text classification models may be used to provide suggested changes to the claim language to increase the probability of the claims being accepted at the patent office(s). In some implementations, information about likely art unit and/or potential examiner for the claims may be provided. For instance, focus and/or rejection rates of particular art unit/examiner may be provided.

While usage of the current disclosure has been described with respect to patent claims, the current disclosure may be utilized to identify and analyze documents in other fields. For example, the current disclosure may be used in supply, trading, and procurement to automate the categorization/classification of supply and chain contracts, autocomplete and summarize contracts, detect ambiguities within contracts, identify strengths/weaknesses in contracts, determine differences between same types of contracts, and/or suggest improvements to contracts. The current disclosure may be used in Health, Safety, and Environment (HSE) in oil and gas industry to automate the categorization/classification of HSE reports, autocomplete and summarize HSE reports, perform risk assessment, to assist with legal and other operations, find most similar scope clause or compensation clause, and/or enable conceptional similarity searches. The current disclosure may be used in engineering fields to improve engineering requirements per INCOSE standards (e.g., ambiguity, conciseness, etc.), and/or facility requirements packaging (e.g., associate requirements with a particular effort/projects/scope). Other usage of the current disclosure is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 and the electronic storage 13 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
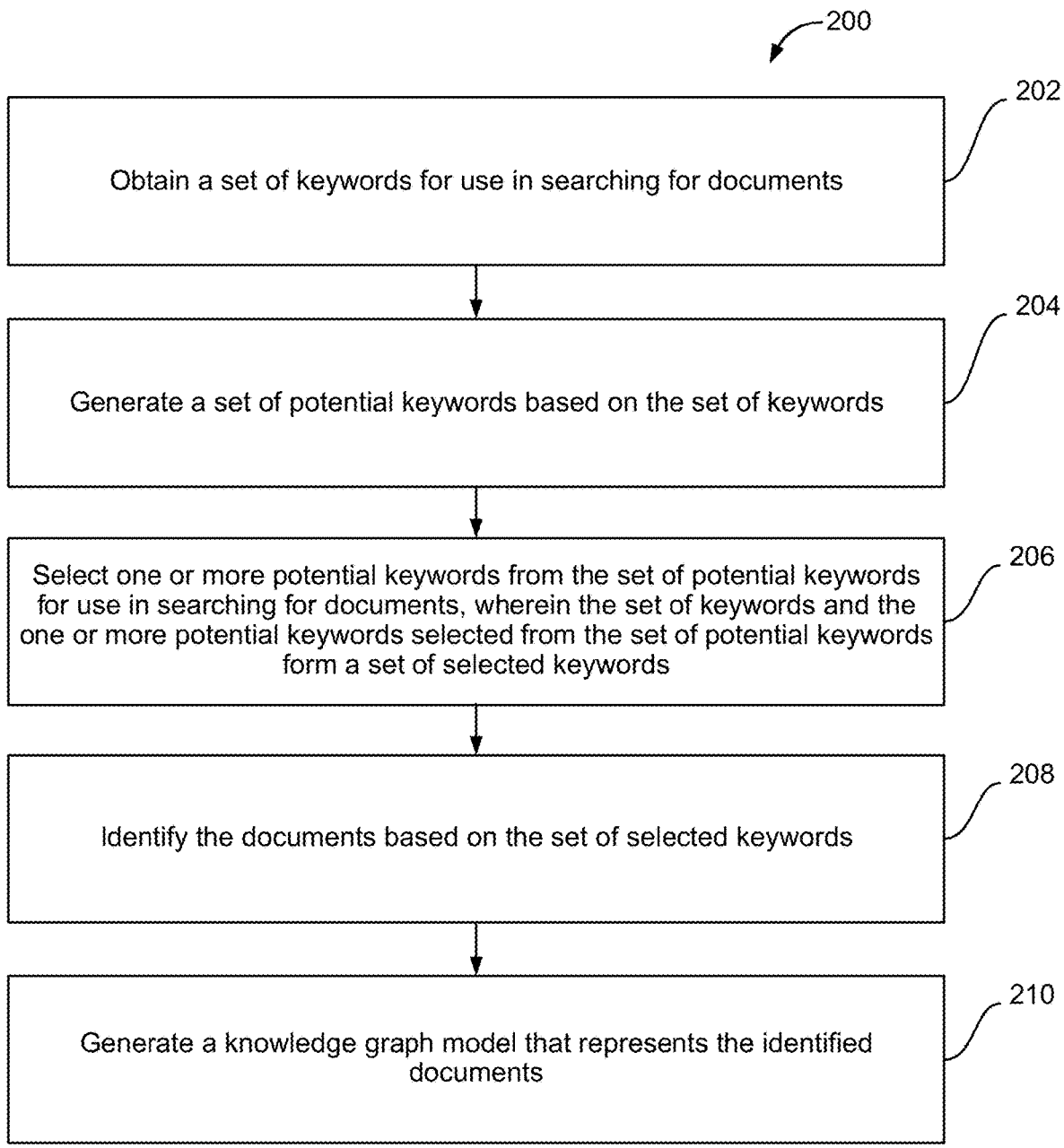
FIG. 2 illustrates an example method for document searching and analysis.

FIG. 2 illustrates method 200 for document searching and analysis. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, a set of keywords may be obtained for use in searching for documents. In some implementation, operation 202 may be performed by a processor component the same as or similar to the keyword component 102 (Shown in FIG. 1 and described herein).

At operation 204, a set of potential keywords may be generated based on the set of keywords and/or other information. In some implementation, operation 204 may be performed by a processor component the same as or similar to the potential keyword component 104 (Shown in FIG. 1 and described herein).

At operation 206, one or more potential keywords may be selected from the set of potential keywords for use in searching for the documents. The set of keywords and the potential keyword(s) selected from the set of potential keywords may form a set of selected keywords. In some implementation, operation 206 may be performed by a processor component the same as or similar to the keyword selection component 106 (Shown in FIG. 1 and described herein).

At operation 208, the documents may be identified based on the set of selected keywords and/or other information. In some implementation, operation 208 may be performed by a processor component the same as or similar to the document component 108 (Shown in FIG. 1 and described herein).

At operation 210, a knowledge graph model that represents the identified documents may be generated. The knowledge graph model may include document nodes representing the identified documents and a first search node representing the set of selected keywords. Relative position of the individual document nodes with respect to the first search node may represent similarity between corresponding identified documents and the set of selected keywords. In some implementation, operation 210 may be performed by a processor component the same as or similar to the model component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for document searching and analysis, the system comprising:
a display; and
one or more physical processors configured by machine-readable instructions to:
obtain a set of keywords from a user for use in searching for documents;
generate a set of potential keywords based on the set of keywords;
present the set of keywords and the set of potential keywords within a graphical user interface on the display, the graphical user interface enabling the user to select one or more keywords and/or one or more potential keywords for use in searching for the documents by accepting or rejecting individual keywords and individual potential keywords for use in searching for the documents;
receive user selection of the one or more keywords and/or the one or more potential keywords based on user interaction with the graphical user interface, the one or more keywords and/or the one or more potential keywords selected by the user forming a set of selected keywords;
identify the documents based on a search query that includes the set of selected keywords; and
generate multiple knowledge graph models that visually represent similarity between the identified documents and corresponding selected keywords for presentation on the display, the multiple knowledge graph models including separate knowledge graph models to show different similarities between the identified documents from the search query and different combinations of the selected keywords used in the search query, the multiple knowledge graph models including a first knowledge graph model for the entirety of the search query that includes all of the selected keywords used in the search query and a second knowledge graph model for a portion of the search query that includes some of the selected keywords used in the search query;
wherein:
the first knowledge graph model for the entirety of the search query includes document nodes representing the identified documents and a first search node representing all of the selected keywords used in the search query, relative position of the individual document nodes with respect to the first search node representing similarity between corresponding identified documents and all of the selected keywords used in the search query;
the second knowledge graph model for the portion of the search query includes the document nodes representing the identified documents and a second search node representing some of the selected keywords used in the search query, relative position of the individual document nodes with respect to the second search node representing similarity between the corresponding identified documents and some of the selected keywords used in the search query; and
differences in the relative position of the individual document nodes with respect to the first search node in the first knowledge graph model and the relative position of the individual document nodes with respect to the second search node in the second knowledge graph model show differences in similarity of the identified documents between the entirety of the search query and the portion of the search query and enable user determination of which ones of the identified documents will be reviewed and/or an order in which the identified documents will be reviewed;
further wherein:
the multiple knowledge graph models display information relating to dates, sizes, authors, owners, and/or publication of the identified documents; and
the multiple knowledge graph models are interactive models such that a given document node of a given knowledge graph model operates as a shortcut to a corresponding identified document, wherein the user clicking on the given document node causes retrieval of the corresponding identified document.

2. The system of claim 1, wherein edges exist between the document nodes and the first search node, and individual edges are labeled with a similarity score reflecting the similarity between the corresponding identified documents and all of the selected keywords used in the search query.

3. The system of claim 1, wherein the first knowledge graph model provides visualization of similarity among the identified documents through clustering.

4. The system of claim 1, wherein the set of keywords includes one or more keywords inputted by the user.

5. The system of claim 1, wherein the set of keywords includes one or more keywords extracted from a source document.

6. The system of claim 1, wherein the set of potential keywords are generated further based on a word-to-vector model and/or a sentence-to-vector model.

7. The system of claim 1, wherein the set of potential keywords are generated further based on domain-specific models, individual domain specific model including an unsupervised vector model trained based on words corresponding to a specific domain.

8. The system of claim 1, wherein the multiple knowledge graph models further includes a combined knowledge graph model for both the entirety of the search query that includes all of the selected keywords used in the search query and the portion of the search query that includes some of the selected keywords used in the search query, the combined knowledge graph model including the document nodes representing the identified documents, the first search node representing all of the selected keywords used in the search query, and the second search node representing some of the selected keywords used in the search query.

9. The system of claim 1, wherein the documents are identified based on searching within one or more databases.

10. The system of claim 1, wherein one or more analytics are performed on the identified documents to generate a categorical report for the identified documents, the categorical report including division of the identified documents into multiple categories, further wherein the division of the identified documents into the multiple categories are presented in charts, graphs, and/or maps.

11. A processor-implemented method for document searching and analysis, the method being performed by one or more physical processors, the method comprising:
obtaining a set of keywords from a user for use in searching for documents;
generating a set of potential keywords based on the set of keywords;
presenting the set of keywords and the set of potential keywords within a graphical user interface on a display, the graphical user interface enabling the user to select one or more keywords and/or one or more potential keywords for use in searching for the documents by accepting or rejecting individual keywords and individual potential keywords for use in searching for the documents;
receiving user selection of the one or more keywords and/or the one or more potential keywords based on user interaction with the graphical user interface, the one or more keywords and/or the one or more potential keywords selected by the user forming a set of selected keywords;
identifying the documents based on a search query that includes the set of selected keywords; and generating multiple knowledge graph models that visually represent similarity between the identified documents and corresponding selected keywords for presentation on the display, the multiple knowledge graph models including separate knowledge graph models to show different similarities between the identified documents from the search query and different combinations of the selected keywords used in the search query, the multiple knowledge graph models including a first knowledge graph model for the entirety of the search query that includes all of the selected keywords used in the search query and a second knowledge graph model for a portion of the search query that includes some of the selected keywords used in the search query;
wherein:
the first knowledge graph model for the entirety of the search query includes document nodes representing the identified documents and a first search node representing all of the selected keywords used in the search query, relative position of the individual document nodes with respect to the first search node representing similarity between corresponding identified documents and all of the selected keywords used in the search query;
the second knowledge graph model for the portion of the search query includes the document nodes representing the identified documents and a second search node representing some of the selected keywords used in the search query, relative position of the individual document nodes with respect to the second search node representing similarity between the corresponding identified documents and some of the selected keywords used in the search query; and
differences in the relative position of the individual document nodes with respect to the first search node in the first knowledge graph model and the relative position of the individual document nodes with respect to the second search node in the second knowledge graph model show differences in similarity of the identified documents between the entirety of the search query and the portion of the search query and enable user determination of which ones of the identified documents will be reviewed and/or an order in which the identified documents will be reviewed;
further wherein:
the multiple knowledge graph models display information relating to dates, sizes, authors, owners, and/or publication of the identified documents; and
the multiple knowledge graph models are interactive models such that a given document node of a given knowledge graph model operates as a shortcut to a corresponding identified document, wherein the user clicking on the given document node causes retrieval of the corresponding identified document.

12. The method of claim 11, wherein edges exist between the document nodes and the first search node, and individual edges are labeled with a similarity score reflecting the similarity between the corresponding identified documents and all of the selected keywords used in the search query.

13. The method of claim 11, wherein the first knowledge graph model provides visualization of similarity among the identified documents through clustering.

14. The method of claim 11, wherein the set of keywords includes one or more keywords inputted by the user.

15. The method of claim 11, wherein the set of keywords includes one or more keywords extracted from a source document.

16. The method of claim 11, wherein the set of potential keywords are generated further based on a word-to-vector model and/or a sentence-to-vector model.

17. The method of claim 11, wherein the set of potential keywords are generated further based on domain-specific models, individual domain specific model including an unsupervised vector model trained based on words corresponding to a specific domain.

18. The method of claim 11, wherein the multiple knowledge graph models further includes a combined knowledge graph model for both the entirety of the search query that includes all of the selected keywords used in the search query and the portion of the search query that includes some of the selected keywords used in the search query, the combined knowledge graph model including the document nodes representing the identified documents, the first search node representing all of the selected keywords used in the search query, and the second search node representing some of the selected keywords used in the search query.

19. The method of claim 11, wherein the documents are identified based on searching within one or more databases.

20. The method of claim 11, wherein one or more analytics are performed on the identified documents to generate a categorical report for the identified documents, the categorical report including division of the identified documents into multiple categories, further wherein the division of the identified documents into the multiple categories are presented in charts, graphs, and/or maps.

\* \* \* \* \*